C. A. SANBORN.
ROASTING PAN.
APPLICATION FILED AUG. 18, 1916.
1,258,049. Patented Mar. 5, 1918.
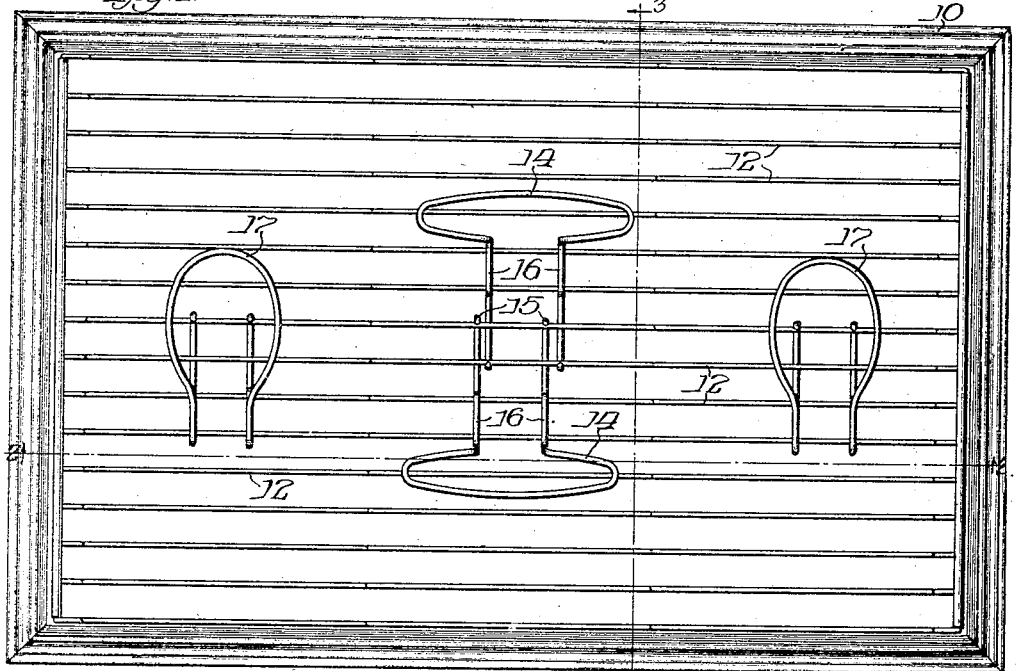
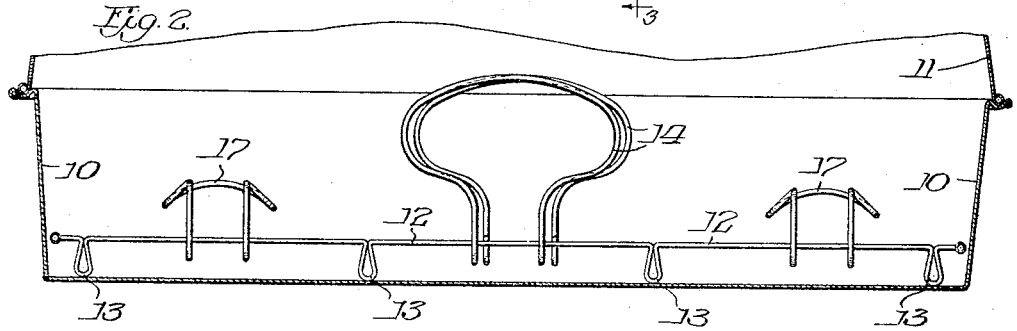
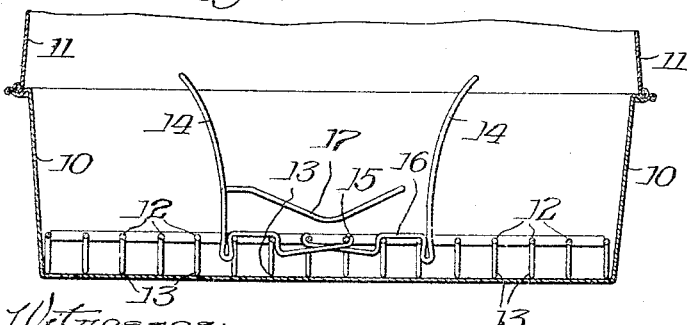

UNITED STATES PATENT OFFICE.

CORA A. SANBORN, OF BROOKLYN, NEW YORK.

ROASTING-PAN.

1,258,049.

Specification of Letters Patent.

Patented Mar. 5, 1918.

Application filed August 18, 1916. Serial No. 115,675.

*To all whom it may concern:*

Be it known that I, CORA A. SANBORN, a citizen of the United States, and resident of Brooklyn, in the county of Kings and State of New York, have invented certain new and useful Improvements in Roasting-Pans, of which the following is a specification.

My invention relates to culinary devices and has particular reference to a device for use in connection with the roasting of fowls.

It is common practice in the roasting of fowls to place the fowl on its back in a roasting pan. This is incorrect, as will be readily admitted, inasmuch as the portion of the fowl wherein the flesh is thickest is placed the greatest distance from the fire: as a consequence the back of the fowl is not infrequently burned in order to properly cook the opposite side. Not only is the arrangement referred to incorrect from a physical standpoint but the result as far as the final quality of the roast is concerned is not as satisfactory as when the fowl is roasted with the breast down. In this position the juices evolved in the cooking process must pass through or over the breast thus making it much more juicy and palatable.

While it has been heretofore thought to be desirable to roast a fowl with the breast downward and to locate the fowl in such position that it is spaced away from the bottom of the pan, no means have been provided which are at the same time readily adaptable to all sizes and shapes of fowls and the manipulation of which requires no more skill than is possessed by any housewife. With the points heretofore mentioned in mind, I have designed an arrangement whereby a simple series of wire brackets are located in the bottom of a roasting pan, the feet of the brackets or supports having a hook engagement with the bars of an ordinary grid such as is commonly used in the bottom of a roasting pan.

While I have described and illustrated the invention as applicable to the roasting of fowls it will be understood that many of the advantages accruing to the use thereof for roasting fowls will also accrue in the roasting of other meats. A roast of any sort will cook more satisfactorily if elevated above the bottom of the pan, thus giving the vapors free circulation and preventing the burning or sticking of the meat to the pan.

The invention will be more readily understood by reference to the accompanying drawings in which Figure 1 is a plan view of a roasting pan to which my improvement has been applied, the cover of the pan being removed;

Fig. 2 is a longitudinal sectional view on the line 2—2 of Fig. 1; and,

Fig. 3 is a sectional view on the line 3—3 of Fig. 1.

In the drawings an ordinary roasting pan 10 is shown such pan being usually equipped with a cover 11. Loosely fitting within the lower portion of the pan is a grid composed of wires bent to form longitudinal members 12 having loops 13 which act as legs to support the grid and space the same from the bottom of the pan. My improvement consists essentially in the provision of one or more pairs of supports or brackets arranged in coöperative relation and adapted to removably engage a plurality of the longitudinal members of the grid. An object which is gained by such construction is that the same brackets or supports may be employed for different sizes and shapes of fowls or roasts. When a fowl is to be roasted the brackets are so placed as to provide a wedge shaped space between a pair thereof in which space the fowl is held, the engagement of the supports with the fowl being at the sides thereof. This limits the space which is covered by the supporting means and locates such space at the sides of the fowl instead of at the breast or back. The brackets which I prefer to employ for supporting fowls comprise wires bent to form large loops 14 as best shown in Figs. 1 and 2, the ends of the wires being bent at substantially right-angles to form feet terminating in toes or hooks 15 which engage beneath or hook around one or more of the longitudinal members 12 of the grid. The intermediate portion of the foot is offset vertically as at 16 to lie above two of the longitudinal members of the grid. In this manner the support may be located at any point in the width of the pan and the pair of supports may be brought closely together by overlapping the feet as shown in Fig. 3. The supports in end elevation are shown in Fig. 3 and will preferably be bent outwardly in such manner as to provide a space between the coöperating supports within which the fowl may be wedged.

I have shown two of the brackets which I preferably employ for supporting a fowl although in some instances it may be necessary to employ a greater number to properly support a large or heavy fowl; or I may prefer to support one end of the fowl or roast in the brackets described and the other end upon the auxiliary supports which consist in a dished horizontal loop 17 and grid-engaging feet identical with those heretofore described. By the use of the two appliances the fowl may be maintained in an upright position by the use of the larger supports and spaced away from the grid by the use of the smaller supports. In some instances I may desire to support a roast of meat upon two or more of the auxiliary supports 17. While I have shown two of the auxiliary supports 17 it will be understood that these may be arranged in such manner as to require only one or more than two.

The exact shape of the supports or brackets is immaterial as it is understood they will be shaped in the best manner to engage the fowl or roast to be treated. Furthermore, the exact form of engagement with the grid is not important, simplicity and ease of engagement and disengagement being the one essential.

I claim:

1. A roast support composed of wire bent to form a roast engaging portion and a plurality of feet, said feet being adapted to overlie and underlie adjacent bars of a roasting pan grid.

2. A roast support composed of wire bent to form a roast engaging portion and a plurality of feet, said feet being adapted to overlie and underlie adjacent bars of a roasting pan grid and having hooks at their extremities for removably engaging one of said bars.

3. A roast support composed of wire bent to form a roast engaging portion and a pair of feet, said feet being adapted to overlie any bar of a roasting pan grid, underlie the next adjacent bar and removably engage the second adjacent bar.

4. A roast support composed of wire bent to form a roast engaging portion and a foot portion extending parallel with the bottom of the pan, said foot portion terminating in a toe adapted to underlie a portion of a roasting pan grid, the adjacent portion of said foot being shaped to engage and lie above an adjacent portion of said grid, substantially as described.

5. In a device of the class described the combination of a pan, a grid in the bottom of said pan, and roast supporting members having feet adapted to overlie any bar of said grid, underlie the next adjacent bar and removably engage the second adjacent bar.

Signed at 798 Nostrand ave., B'kyn, N. Y., this 14th day of August, 1916.

CORA A. SANBORN.

Witnesses:
M. C. O'BRIEN,
W. V. KOSBOB.

Copies of this patent may be obtained for five cents each, by addressing the "Commissioner of Patents, Washington, D. C."